(12) United States Patent
Artaud et al.

(10) Patent No.: US 9,574,688 B2
(45) Date of Patent: Feb. 21, 2017

(54) JOINING DEVICE FOR CONDUITS AND ASSOCIATED JOINING PROCESS

(75) Inventors: Benoit Artaud, Paris (FR); Stephane Heraud, Paris (FR); Daniel Lecroc, Plaisir (FR)

(73) Assignee: DESIGNED METAL CONNECTIONS, INC., Gardena, CA (US)

( * ) Notice: Subject to any disclaimer, the term of this patent is extended or adjusted under 35 U.S.C. 154(b) by 1269 days.

(21) Appl. No.: 13/382,125

(22) PCT Filed: Jun. 25, 2010

(86) PCT No.: PCT/US2010/040060
§ 371 (c)(1),
(2), (4) Date: Mar. 26, 2012

(87) PCT Pub. No.: WO2011/005606
PCT Pub. Date: Jan. 13, 2011

(65) Prior Publication Data
US 2012/0174383 A1 Jul. 12, 2012

(30) Foreign Application Priority Data
Jul. 6, 2009 (FR) .................................. 09 54658

(51) Int. Cl.
*F16L 13/14* (2006.01)
*F16L 15/00* (2006.01)

(52) U.S. Cl.
CPC ......... *F16L 15/009* (2013.01); *Y10T 29/49954* (2015.01)

(58) Field of Classification Search
USPC ... 285/921, 382.4, 304, 55, 258, 382, 382.1, 285/382.2
See application file for complete search history.

(56) References Cited

U.S. PATENT DOCUMENTS 2,461,705 A * 2/1949 Stranberg ................. 137/614.04
2,701,147 A * 2/1955 Summerville .................... 285/1
(Continued)

FOREIGN PATENT DOCUMENTS

DE 20109548 U1 10/2002
DE 202005016424 U1 12/2005
(Continued)

OTHER PUBLICATIONS

Extended European search report dated Sep. 3, 2014, issued in corresponding European application 10797620.1.
(Continued)

*Primary Examiner* — Aaron Dunwoody
(74) *Attorney, Agent, or Firm* — Norton Rose Fulbright US LLP (57) ABSTRACT

First and second conduits are joined in a manner to control electrical resistance of a conduit circuit. A cylindrical section of an adapter is placed onto an end of the first conduit. A part of the cylindrical section is crimped onto the first conduit while a spacing block made of a polymer material having a previously chosen conductivity is positioned around the end of the first conduit and clipped onto the cylindrical section. The crimping locks the spacing block to the adapter and deforms an assembly comprising the clipping pieces of the spacing block and the adapter, so as to immobilize the clipping pieces relative to each other in a direction parallel to an axis of the cylindrical section of the adapter, and such that an exterior surface of the first conduit engages interior surfaces of the spacing block and the adapter.

19 Claims, 8 Drawing Sheets

(56) References Cited

U.S. PATENT DOCUMENTS

| | | | | |
|---|---|---|---|---|
| 3,572,779 | A | | 3/1971 | Dawson ................... 285/382.2 |
| 3,588,149 | A | * | 6/1971 | Demler et al. ................ 285/110 |
| 3,910,502 | A | * | 10/1975 | Mermillod ................... 239/531 |
| 4,011,652 | A | | 3/1977 | Black ......................... 29/455 R |
| 4,128,264 | A | * | 12/1978 | Oldford .......................... 285/41 |
| 4,277,091 | A | | 7/1981 | Hunter ........................... 285/55 |
| 4,530,527 | A | * | 7/1985 | Holmberg ................. 285/382.4 |
| 4,548,427 | A | * | 10/1985 | Press ................... F16L 27/107 |
| | | | | 285/114 |
| 4,616,856 | A | * | 10/1986 | Kowalyshen .................. 285/92 |
| 4,691,943 | A | | 9/1987 | DeLand et al. .............. 285/315 |
| 4,893,848 | A | * | 1/1990 | Melcher ....................... 285/258 |
| 4,905,766 | A | * | 3/1990 | Dietz et al. .................... 169/91 |
| 5,080,406 | A | | 1/1992 | Hyatt et al. .................. 285/330 |
| 5,083,818 | A | * | 1/1992 | Schoot ........................... 285/81 |
| 5,478,122 | A | * | 12/1995 | Seabra ......................... 285/281 |
| 6,217,082 | B1 | * | 4/2001 | Orcutt et al. ................. 285/272 |
| 7,040,668 | B2 | * | 5/2006 | Ezura ........................... 285/308 |
| 7,249,789 | B2 | * | 7/2007 | Haney et al. ................. 285/374 |
| 7,802,824 | B2 | * | 9/2010 | Christensen et al. ........ 285/399 |

FOREIGN PATENT DOCUMENTS

| | | |
|---|---|---|
| JP | 55144817 U | 10/1980 |
| WO | WO 82/02755 A1 | 8/1982 |
| WO | WO 96/05556 A1 | 2/1996 |
| WO | WO 2006/049956 A1 | 5/2006 |
| WO | WO 2007/110501 A1 | 10/2007 |

OTHER PUBLICATIONS

Japanese language office action dated Feb. 12, 2014, and its English language translation issued in corresponding Japanese application 2012519568.

Chinese language office action dated Feb. 25, 2014, and its English language translation issued in corresponding Chinese application 201080030624.8.

Indonesian Substantive Examination Report dated Jun. 16, 2016 for corresponding Indonesian application W00201104549.

* cited by examiner

JOINING DEVICE FOR CONDUITS AND ASSOCIATED JOINING PROCESS

CROSS-REFERENCE TO THE RELATED APPLICATIONS

This application is a national stage of international application No. PCT/US2010/040060, filed on Jun. 25, 2010, and claims the benefit of priority under 35 USC 119 to French Patent Application No. 0954658, filed on Jul. 6, 2009, the entire contents of which are incorporated herein by reference.

This invention concerns a joining device for gas or liquid conduits carried in an aircraft and an associated joining process.

The invention applies, for example, to the nitrogen circuits of airplane fuel tanks, in which the normal pressure is generally 15 bars (200 psi) or even higher. These nitrogen circuits have recently appeared in modern airplanes, and serve the purpose of rendering the fuel tanks inert. The piping passes through the outer part of the fuel tank and is therefore exposed to the fuel.

Because of its location as well as because of the specific electrical and electrostatic characteristics of modern airplanes made of composite materials, this piping must be electrically non-conducting. It must likewise be made of a light material, such as aluminum. Alternatively, piping made of composite materials is likewise conceivable, but it is more expensive. All of the piping, once installed and put into use must likewise resist various chemical products, particularly kerosene, as well as high pressures.

The invention also applies to circuits of cooling liquids (particularly of the "supplemental cooling" type) that operate at pressures of about 15 bars.

The invention likewise applies to oxygen circuits. It also importantly applies to pressurized liquid hydraulic circuits for flight controls or landing gear controls, where the pressure can be significantly higher, for example about 350 bars (5000 psi).

In all of these circuits, one is confronted with the need to control the conductivity of the installed piping circuit.

For metal piping, interconnections between two pieces of conduit can be utilized to control the electrical resistance, or even to provide electrical insulation by means of a non-conducting section. In this regard, the document WO 2006/049956 describes five dielectric tubular piping interconnections for dissipating the electrical energy associated with the accumulation of static charges on the conduits that transport fluids, possibly at high pressure, in an aircraft. At least some of these interconnections include two generally tubular light metal coaxial housings, a cylindrical spacer of PEEK [polyether ketone], a disc shaped spacer of Krefine to control the resistance between the first and the second housings, and an envelope made of a material that contains Teflon. The solution described in this document is complicated to manufacture and to utilize, particularly due to the large number of parts.

The accessories for interconnecting the pipes and the process for their application are also known from the documents U.S. Pat. No. 3,572,779 and WO82/02755. It is specifically taught to radially compress a malleable crimping sleeve.

A conduit for coupling an accessory through axial compression by causing a radial deformation is likewise known from the document WO96/05556.

Lastly, a crimpable interconnection accessory—or adapter—for a conduit comprising a sleeve that is to be attached by crimping it to one end of a conduit tube and that is to, at least indirectly, engage with another conduit element is known from the document WO2007/110501. The sleeve surface that is to come into crimping contact with the end of the tube includes a section coated with an adhesive comprising at least two components, one of which is encapsulated. This glued-on section is advantageously recessed, preferably by projecting flanges.

In this context and for the purpose of resolving the problem alluded to above, a process for interconnecting at least a first and a second conduit to control the electrical resistance of a piping circuit is characterized in that it comprises the following steps:

placing a cylindrical section of a connection onto an end of the first conduit crimping at least a part of the cylindrical section onto a first conduit, with a spacing block of a polymeric material having a preselected conductivity being positioned in the extension of the end of the first conduit and clipped to the cylindrical section, with the crimp then locking the spacing block to the adapter.

joining of the spacing block to the end of the second conduit.

This process makes it possible to readily form a network of conduits having a controlled resistance by means of the choice of the polymeric material and the crimping that causes the conduits to interlock.

It should be noted that the end of the conduits considered here is tubular or at least cylindrical in the broad sense, that is to say defined by a longitudinal axis and a mouth that can be circular or non-circular. The cylindrical section of the joint is preferably configured to serve as an outer (or possibly inner) sleeve at the end of the first conduit. Specifically, if the end of the first conduit exhibits rotational symmetry, then the cylindrical section preferably likewise exhibits a general rotational symmetry.

It is further noted that the axes of the first and second conduits can be aligned or offset angularly in relation to one another, in which case the spacing block and the interconnection have a geometry permitting an angular offset.

It is also noted that the term spacing block is used to designate a rigid part that connects two other parts and maintains them at a fixed spacing, and that the term crimping designates a mechanical fastening operation without welding, for example by compression.

Of particular importance is the fact that the electrical resistance of the resulting conduit network can be controlled by selecting the material and the size of the spacing block, while retaining the conduits required for the application, for example, aluminum, titanium or stainless steel conduits of a given geometry.

The interconnecting device is installed at the location of the conduit, and is permanent once it is installed. Because of the method of attachment by crimping, the mounting can be performed at the location of the conduit network, possibly in the presence of geometric constraints (obstruction, limited accessibility).

The proposed solution makes it possible to establish a connection that is resistant to forces of traction and rotation. The resulting connection is also watertight.

According to an advantageous characteristic, the crimping step encompasses a deformation of an assembly consisting a clipping piece of a spacing block and a complementary clipping piece of the adapter so as to axially immobilize the two clipping pieces with respect to one another.

The mutual immobilization of the two clipping pieces participates in locking the spacing block with respect to the adapter and is obtained specifically through the confinement of a male part in a closed cavity, as well as by increasing the friction between the two surfaces. The two parts are rotationally immobilized with respect to one another by friction. They are likewise rotationally immobilized with respect to one another by clipping, if, advantageously, a screw thread is provided between the spacing block and the adapter. Finally they are simultaneously immobilized with respect to each other against displacement in the axial direction (that is to say, parallel to the axis of the adapter—or at least of the cylindrical section of the adapter or of the spacing block) by friction and by the confinement of the male part in the closed cavity (as well as by the screw thread possibly provided between the spacing block and the adapter).

According to an advantageous characteristic, the first conduit maintains the clipping shape of the spacing block during the crimping stage.

This characteristic makes it possible to reinforce the deformation of the resulting assembly of the clipping piece of the spacing block and of the complementary clipping piece, since this assembly is then compressed between the conduit and the crimping tool.

According to an advantageous characteristic, the first conduit is positioned prior to the crimping step so as to immobilize the assembly consisting of a clipping piece of the spacing block and a complementary clipping piece of the adapter in the clipped position. Thus, once the crimping has been performed, the conduit locks the clipped joint and therefore locks the spacing block with respect to the adapter.

According to an advantageous characteristic, the longitudinal distance (taken at its absolute value) between a clipping piece of the adapter and a section of the adapter to which the crimping is applied is less than two times the reference transverse width of the first conduit, or else equal to this reference transverse width, or 50% or 25% of this reference width.

In the case of a circular conduit, this reference width can be the diameter, or else the inside diameter. It should be noted that the inside diameter of the adapter was selected to be equal to the diameter of the first conduit as measured on the outside thereof if the crimping operation is performed from the outside.

This choice of positioning of the crimping area in relation to the clipping piece makes it possible to ensure that, while performing the locking operation of the spacing block with respect to the adapter, the crimping of the adapter onto the conduit, particularly by deformation of the assembly consisting of two complementary clipping pieces, is effective. Below a distance of 0.5 times the diameter, and even 0.2 times, the deformation is greater and ensures, a fortiori [all the more certainly], a tighter interlock.

According to the alternative definition of this characteristic, the crimping is performed such that the ratio between the length over which the crimping is performed and the useful contact length between the adapter and the conduit tube is between 0.5 and 1.33.

It should be noted for the subsequent description that the ID is the length of useful contact between the adapter and the conduit tube, parallel to the axis of the adapter. If all of the material of the adapter is used for the crimping, it concerns the longitudinal distance between the mouth of the adapter of the side on which the first conduit is located and the complementary clipping piece of the adapter.

It should be noted for the subsequent description that the IF is the length parallel to the axis of the adapter over which the crimping action is performed. If all of the material of the adapter is used for the crimping, it is measured from the mouth of the adapter of the side on which the first conduit is located.

The selection of this IF/ID ratio makes it possible to ensure that, while performing the operation of locking the spacing block with respect to the adapter, the crimping of the adapter onto the conduit, specifically by the deformation of the assembly consisting of two complementary clipping pieces, is effective. At an IF/ID ratio greater than 0.66, the deformation is greater and ensures, a fortiori, a tighter interlock.

According to an advantageous characteristic, the crimping consists of external crimping by radial compression by means of a variable diameter jaw.

Alternatively, it may entail an expansion (or internal crimping)

Alternatively, the crimping is accomplished via a longitudinal translation of a sleeve along an outside surface of the adapter having an increasing diameter, causing a radial compression thereof.

In one important application, at least the first conduit is made of titanium.

In other applications, at least the first conduit is made of stainless steel or of aluminum.

In all three cases, the second conduit is generally made of the same material as the first, but a different metal is also conceivable, if the application necessitates or allows for this. The adapter itself can be of the same material as the conduit or of a different material (for example an adapter of stainless steel on a titanium conduit, or an adapter of titanium on a conduit of stainless steel).

According to a second characteristic, the invention likewise proposes a joining device for conduits to control the electrical resistance of a conduit circuit with this device comprising:
   an adapter comprising a cylindrical section that is to be positioned at the end of a conduit and crimped onto it.
   a spacing block of a polymeric material, this spacing block being designed so as to be clipped onto said cylindrical section, and to being connected to the end of another conduit,
   with the device being designed for crimping at least one part of the cylindrical section onto a conduit, while the spacing block is clipped to the adapter in the extension of the end of the conduit, this results in the locking of the spacing block with respect to the adapter.

This device makes it possible to readily form a network of conduits with controlled electrical resistance, by introducing a spacing block, the polymeric material of which is selected so as to obtain a desired electrical resistance.

According to the advantageous characteristics, the joining device is characterized in that
   the adapter comprises an area, called the crimping area, upon which the forces applied by the crimping tool act
   the spacing block comprises a clipping piece designed to engage with a complementary clipping piece of the adapter.

The crimping area of the adapter is designed so that a crimping action applied to the crimping area causes the assembly consisting of the two clipping areas to deform, so as to longitudinally immobilize one with respect to the other.

As a result of this characteristic, the locking produced by the crimping is particularly effective because of the deformation.

Moreover, the crimping reduces the axial play between the two clipping pieces and creates friction between the two.

According to an advantageous characteristic, with the spacing block having a clipping pieces designed to engage with a complementary clipping piece of the adapter, it is better designed to enable the positioning of a conduit in a crimping position, so that a conduit in the crimping position radially immobilizes the clipping piece in the clipped position.

Thanks to this characteristic that readily implemented, the locking, which immobilizes the conduit longitudinally, is easily achieved by crimping.

According to another advantageous characteristic, the spacing block is furthermore designed to allow a first conduit to be positioned with longitudinal freedom in the positioning of the first conduit with respect to the spacing block equal to at least 2% or advantageously, 3%, 8%, 15% or 25% of a representative transverse width of the spacing block.

This characteristic is particularly of interest when the clipping piece of the spacing block allows for general rotational symmetry, and in this case, the transverse width of the spacing block can be assumed to be equal to the diameter of the surface of the clipping piece in contact with the conduit, which can be the internal diameter if the crimping is performed externally.

The spacing block is then designed to enable the positioning of a conduit with freedom for positioning the conduit longitudinally with respect to the spacing block at least equal to 2%, or preferably, 3%, 8% or 15%, for example of the width in question.

It should be noted that the internal diameter of the clipping piece of the spacing block in contact with the conduit is advantageously assumed to be equal to the outside diameter of the conduits of this application.

As explained previously, the conduit can immobilize the clipping piece in the clipped position. Thus, as a result of this positioning freedom, the spacing block is designed to enable the positioning of a conduit in at least a first and a second external position, and advantageously any intermediate positions.

The spacing block radially immobilizes the clipping piece in the clipped position in all of these useful positions for the conduit.

Moreover, the second crimping position is separated from the first crimping position by a longitudinal translation of at least 2% of the internal diameter of the clipping piece or more.

The device can thus be used in a flexible manner, without the need to cut a section of the conduit, if it is too long.

According to an alternative description of this characteristic, the longitudinal positioning freedom is equal to at least the longitudinal reference dimension of the clipping piece, or preferably two times that dimension. In the context of this description, the longitudinal dimension of the clipping piece is then taken as a reference due to its interaction with the conduit. This longitudinal dimension can, for instance, be a radius of a projection.

As it happens, according to another advantageous characteristic, the clipping piece of the spacing block comprises a projection, the radial cross-sectional profile of which is more or less circular, with the complementary clipping piece of the adapter comprising a cavity, the radial cross-sectional profile of which is complementary to said projection.

According to an advantageous characteristic, the clipping piece of the spacing block and the complementary clipping piece of the adapter allow for rotational symmetry.

According to an advantageous characteristic, the spacing block is made of polyurethane ketone (PEEK), for example of PEEK loaded with 15 to 45% of glass fibers. PEEK loaded with carbon fibers can also be used; these two types of fibers serve as mechanical reinforcements. Other materials constituting a mechanical reinforcement can be used, alone or in combination. The spacing block has reinforced mechanical properties in this case. The electrical insulation is likewise greater than in a similar system where the spacing block is made of PEEK loaded with carbon nanotubes. In the current state of affairs, PEEK loaded with glass fibers is considered to be a completely non-conducting material.

Alternatively, the spacing block is made of PEEK loaded with carbon nanotubes up to 10%, or preferably between 0.5% and 3%, perhaps even between 0.1 and 3%. It can likewise be made of PEEK simultaneously loaded with carbon nanotubes and of a material constituting a mechanical reinforcement.

Alternatively, the spacing block can be made of polyphenylene sulfide.

The conductivity of the material can have different values, and a non-conducting spacing block or a spacing block made of a material whose conductivity is between $10^2$ and $10^8 \Omega$, for example, can specifically be used according to the present application.

Generally speaking, the joining device is suitable for connecting two aluminum, titanium or stainless steel conduits installed in an aircraft.

Furthermore, the spacing block includes a non-conducting section having a longitudinal dimension between 5 and 50 mm.

In this way, the adapter can sustain a high breakdown voltage, while retaining its small size.

The invention will now be described in detail by means of the attached figures, of which.

Figure 1:
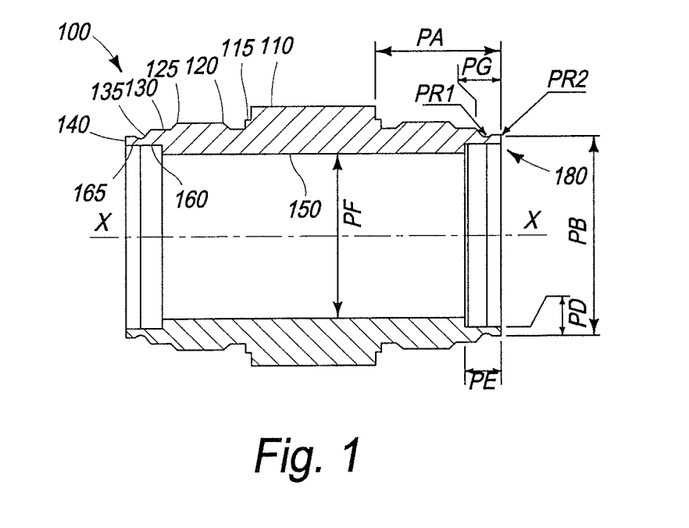
FIG. 1 is a sectional view of a spacing block used in the invention.

With reference to FIG. 1, the spacing block 100 of a polymeric material is a hollow part exhibiting an rotational axis of symmetry X-X shown horizontally, and, in the depicted embodiment, a symmetry with respect to a plane perpendicular to the X-X axis. It is apparent that FIG. 1, like the other attached figures, is an axial sectional view of the various parts in question.

The external profile of the spacing block 100 has a central section 110 extending over about one third of its length, ending at a distance PA from each of the ends of the spacing block. This center section 110 ends at a distance PA from each of the ends of the spacing block. This center section 110 ends with a small step 115 descending into a groove 120 that, as will be seen later, is designed to receive an o-ring.

A projecting external threading 125 is located on the other side of groove 120. The external profile of the spacing block 100 then exhibits a flat section 130 in continuation of the throat, followed by a depression 135 and a final projection 140.

The internal profile of the spacing block 100 has a cylindrical center section 150 representing four-fifths of its length. This center section 150 has an inside diameter PF. The internal profile of the spacing block is completed by a widened section 160 on each of the ends of the spacing block, of length PE parallel to axis X-X, with a diameter PC slightly (about 10%) larger than PF.

The connection between the center section and the widened section is a disc shaped portion perpendicular to the plane of the figure, which is located to the right of flat section 130 of the exterior profile of the part (that is to say on the same radius). In other embodiments, this disc shaped portion is located to the right of the thread 125, or even to the right of the center section 110.

On the outermost third of its length, the widened section 160 comprises a splayed subsection 165, the diameter of which progressively deviates from the dimension PC. The splaying begins to the right of the depression 135.

Each of the ends of the spacing block constitutes a clipping mechanism 180. This mechanism begins at a distance PG (measured parallel to the axis X-X) from the end of the spacing block. It consists of a thin section of the spacing block having a thickness PD, and comprises the exterior projection 140 and the depression 135, and, on the inside, a part of widened section 160, particularly comprising the splayed subsection 165. As viewed in an axial section, the clipping mechanism essentially comprises a ball of apparent radius PR2 (projection 140) and a depressed area 135. The radius PR2 is selected to be between 0.8 and 1 mm depending on the sizes of the spacing block. The function of the clipping mechanism will be described below.

It should be noted that the spacing block is configured to accommodate the end of a conduit (as described below in the context of FIG. 4). The presence of two internal diameters PF and PC, which are respectively narrowed and widened, makes it possible to simultaneously provide a reinforced strength with the spacing block, which has a substantial material thickness (narrowed internal diameter PF) over a part of its length, and to enable the introduction of a conduit having an external diameter PC into the area of the clipping mechanism.

Figure 2:
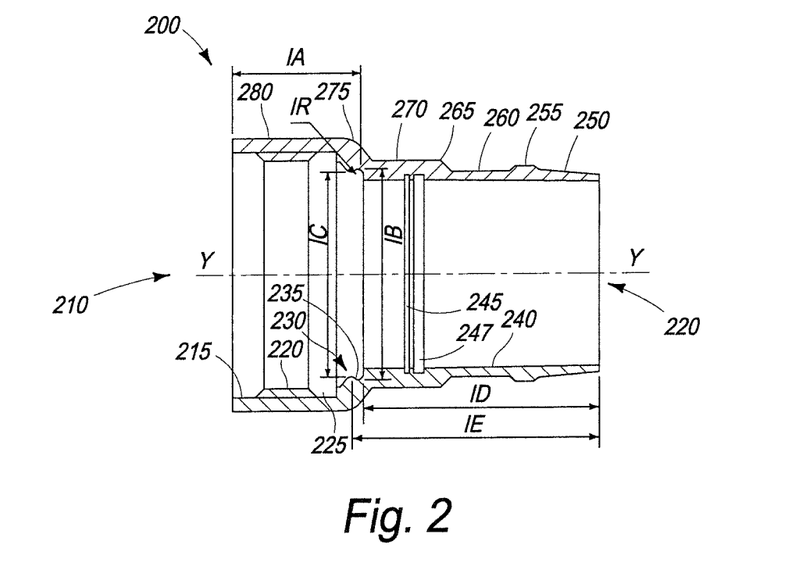
FIG. 2 is a sectional view of an adapter used in an embodiment of the invention.

With reference to FIG. 2, the adapter 200 is a hollow part having a rotational symmetry around an axis Y-Y and two openings, one wide 210 and the other narrow 220, The internal profile of the adapter, from the wide opening, comprises a first flat area 215, followed by a projecting tapping 220 for engaging the thread 125 of the spacing block 100, then a groove 225 designed to receive an o-ring. This internal profile then has a large protuberance 230, whose surface is essentially directed toward the wide opening and to the axis of rotation. Along the section corresponding to this large protuberance, the diameter of the internal profile of the adaptor decreases to a value IC at the end of the section corresponding to the protuberance.

The internal profile of the adapter then comprises a spherical cavity 235 having a diameter IR, the bottom of which (seen from the axis of rotation), forms a diameter IB of the adapter, slightly (about 4%) greater than IC.

In progressing from the wide opening 210 toward the narrow opening 220 of the adapter, the internal profile then comprises a long cylindrical section up to the smaller opening having a diameter D slightly smaller than IC (about 9%), and which is selected to be equal to the diameter PC of the spacing block. This section 240 comprises two short widened subsections 245 and 247 that are adjacent to one another. The widened subsection 245 has sharp angles designed to grab the adapter once it is placed and crimped onto a conduit, which improves the properties of the adapter concerning longitudinal traction or an increase in the pressure of the transported fluid. The widened subsection 247 itself is filled with a layer of silicone forming a seal once the adapter is placed on a conduit. Alternatively, the two enlarged subsections (or grooves) can both be filled with silicone forming a seal.

The outside profile of the adapter from the narrow opening 220 comprises a slightly inclined area 250 having an increasing diameter, a projecting flat area 255, a receding flat area 260 roughly in the extension of a slightly inclined area 250, a shoulder 265 followed by a new flat area constituting an intermediate plateau 270, then a second shoulder 275 and a high planar area 280 ending at the wide end 220 of the adapter.

The projecting area 255 does not have the rotational symmetry of the rest of the adapter 200. In the section depicted in FIG. 2, its top is flat, parallel to the longitudinal axis Y-Y. Under certain angles around the longitudinal axis, its top is conversely rounded. During the crimping operation (described below in the context of a later figure), this projecting area 255 breaks the rotational symmetry of the crimped adapter and thus to improve the resistance to torsional stress.

The depression 225 is to the right of a part of the high flat area 280 (that is to say on the same radius), the large protuberance and cavity 235 are to the right of the second shoulder 275, whereas the two widened subsections 245 and 247 are to the right of intermediate plateau 270.

The ensemble consisting of the large protuberance 230 and the cavity 235 constitutes a female clipping mechanism. Parallel to the axis Y-Y, the section defined by this mechanism is located between two planes, of which the one the farthest from wide opening 210 is at a distance IA from it and at a distance ID from narrow opening 220. The plane defined by the minimum internal diameter 1C, constituting the borderline between the large protuberance 230 and the cavity 235 is itself at a distance IE from narrow end 220.

The female clipping mechanism is designed to engage with the male clipping mechanism of the spacing block, as will be explained later.

Different materials are used in the embodiments that are described. This involves polyurethane ketone (PEEK) loaded with up to 30% of glass fibers in a first embodiment of the spacing block and polyphenylene sulfide (PPS) in a second embodiment. PEEK has the advantage of having a thermal expansion coefficient very close to that of adapters made of aluminum 6061-T6, used for aluminum conduits.

This choice of materials makes it possible to reduce the size and the mass of the spacing block.

PEEK has the additional advantage of having a thermal expansion coefficient that is very close to that of aluminum, making it possible to reduce stresses that may arise in case of a temperature change during the use of the conduits.

This choice of materials makes it possible to obtain a joining device with better mechanical properties, unlike for example a joining device that would make use of an elastomeric spacing block.

Moreover, the resulting joining device has isotropic electrical properties, which is advantageous with respect to a joining device using an anisotropic material, for example with oriented fibers.

Alternatively, PEEK loaded with carbon nanotubes is used for the spacing block, which is then employed specifically with stainless steel adapters, for use on stainless steel or titanium conduits, or with titanium adapters on the titanium conduits. PEEK, simultaneously loaded with carbon nanotubes and glass fibers, can likewise be used.

It should be pointed out that PEEK is resistant to breakage and to aging (chemical aging by exposure to kerosene or mechanical).

In practice, the adapter and the spacing block can be furnished to the user already clipped to one another, and the step of placing the adapter onto the end of the first conduit is performed while the spacing block is joined to the adapter.

Alternatively, although this is not a favored solution, the adapter and the spacing block can be furnished separately or at least without being joined in advance and the user has the choice of clipping one to the other before placing the adapter onto the conduit onto begin by setting the adapter onto the conduit, before clipping the spacing block onto the adapter. Thus, in certain embodiments, the process encompasses a clipping stage of a clipping piece of the spacing block with a complementary clipping piece of the adapter prior to installing the adapter, in any case, prior to crimping.

Figure 3:
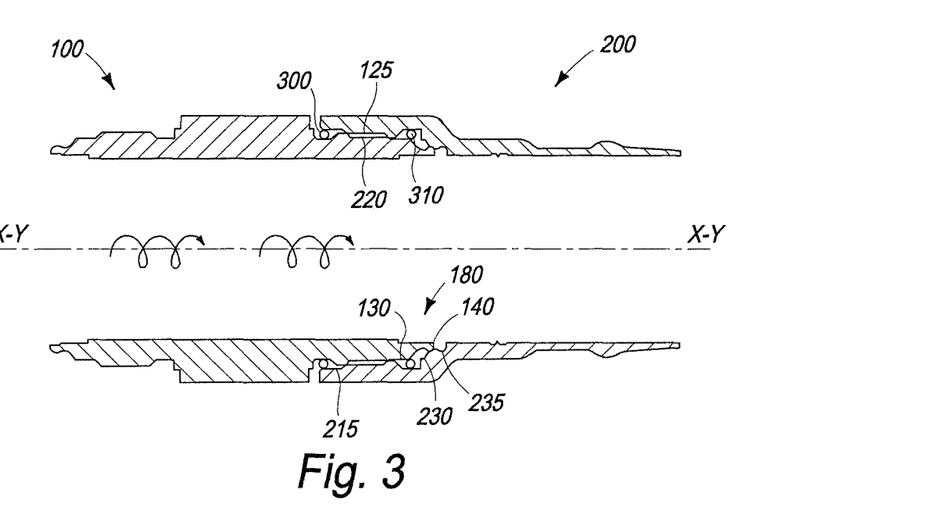
FIG. 3 is a sectional view of the spacing block of FIG. 1 and of the adapter of FIG. 2 in an initial phase of their connection to one another in a first embodiment of the invention.

With reference to FIG. 3, in a step in which the adapter 200 is fixed onto the spacing block 100, the o-rings 300 and 310 are first positioned in the external groove 120 of the spacing block and in the internal groove 225 of the adapter respectively (see the references to the grooves in FIGS. 1 and 2), and the two axes X-X and Y-Y of the two parts are then aligned. Some glue was previously applied to the thread 220 of the adapter 200. This is a glue loaded with an electrically conducting metal.

The thread 125 of the spacing block is then screwed into the tapping 220 of the adapter until the two parts 100 and 200 reach a longitudinal abutment position (shown in FIG. 3), where the first flat area 215 of the internal profile of the adapter is radially positioned with respect to the o-ring 300 in the groove of the spacing block, and the flat area 130 of the spacing block is radially positioned with respect to the o-ring 310 in the groove of the adapter, in the screwing operation is performed with a low torque, which is depicted by a thin arrow on the axis of rotation.

The male clipping mechanism 180 enters into contact, via the projection 140, with the large protuberance 230 of the female clipping mechanism, causing a longitudinal abutment effect.

The screwing in of the parts 100 and 200 can then be continued while engaging the clipping mechanism, by applying a screwing torque greater than that applied up to that point (depicted by the thick arrow on the axis of rotation in FIG. 3).

The clipping mechanism 180 of the spacing block is deformed (not shown) towards the inside of the spacing block, the projection 140 being pushed radially towards the longitudinal axis by the large protuberance 230, which has the effect of a cam or ramp.

The projection 140 goes past the longitudinal abutment position and comes to rest, assuming its initial shape, in the cavity 235, which effects a radial detachment after the large protuberance 230. The configuration of FIG. 4 is attained.

During this clipping (or snapping-together) step, the outside diameter of the clipping mechanism 180, measured over the outside of the projection 140, which was initially equal to PB (see FIG. 1), whereas the lip of the cavity 235 exhibits a diameter equal to IC (FIG. 2), is momentarily reduced (PB-IC)/PB by between 0.5 and 5%, depending on the embodiment(s).

This deformation is reversible, and at this stage, if an unscrewing movement is applied to the spacing block with respect to the adapter, an unclipping is possible, causing the projection 140 to come out of the cavity 235, a momentary deformation of the clipping mechanism 180 around the longitudinal axis of the spacing block and a return to the position of FIG. 3.

Once the clipping has been performed, the end of the flat area 215 of the adapter lies opposite the step 115 of the spacing block, thus closing the space dedicated to the seal 300. Likewise the end of plane section 130 is opposite the edge of large protuberance 230, thus closing the space dedicated to the seal 310, which makes it possible to ensure the water tightness of the joint when the conduits are in operation.

The joining process of this invention can thus include a clipping step performed with a torque of less than 200 N·m. or preferably markedly less, for example, in certain applications, about 3 N·m. The clipping step can advantageously be performed by hand, or by means of a strap wrench, without the need for a particular energy source. The joint of this invention can likewise comprise a step for the positioning of the seals.

The device formed by the thus connected spacing block and the adapter can be stored, moved and delivered to a third person. Due to the glue on the thread 220, the two parts are held firmly in place, with the clipping mechanism essentially ensuring that the parts are held in place.

During the installation of the joint onto a conduit, a conduit tube 500 is then inserted into the adapter (see FIG. 4), up to section defined by the clipping mechanisms. It is guided by the wall of the widened section 160, specifically the wall of the splayed subsection 165 (not shown in FIG. 4, see FIG. 1). The splayed nature of the subsection 165 makes it possible for the conduit tube 500 to progress longitudinally, even if the clipping mechanism 180 is deformed inwards, for example due to an incomplete insertion into the cavity 235.

The conduit tube 500 being used has an outside diameter between the values PC and PF (see FIG. 1), and is thus able to engage with the inside diameter of widened section 160, and, if it is introduced onto a length equal to PE, to reach a abutment position against the detachment (disc portion) corresponding to the flank of center section 150.

Although the outside diameter of the conduit tube 500 is close to the inside diameter of the enlarged section 160 (that is to say close to PC), there is play due to the necessary tolerance for a difference in diameter between the two parts.

Figure 4:
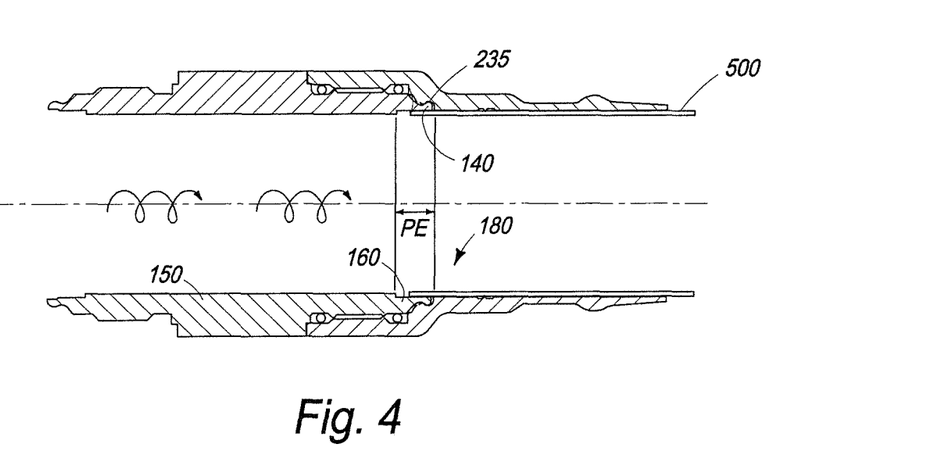
FIG. 4 is a view similar to that of FIG. 3, in a later phase of the interconnection of the spacing block and the adapter, a conduit tube being inserted into the adapter.

In the position shown in FIG. 4, the conduit tube is not completely pushed into the adapter, and is not abutting against the detachment corresponding to the flank of center section 150. Here it is pushed in about two-thirds of the length PE of the widened section 160, that is, more than the diameter—or the longitudinal dimension—of the projection 140.

As of the time that when the conduit tube 500 has been pushed into the widened section 160 over a sufficient length (that is to say greater than the longitudinal dimension of the projection 140, or greater than the radius PR2 defined above), the clipping mechanism 180 is held in the clipped position by the outside wall of the conduit tube 500.

The clipping mechanism actually only has sufficient space to be deformed towards the axis X-X and the projection 140 is forced to remain in the cavity 235. In this regard, it is noted that, although the invention is not based on this characteristic, the material of the conduit tube is more resistant than that of the spacing block in all envisioned applications.

It is pointed out that, in this embodiment, the conduit 500 can be positioned in various crimping positions, differing from each other by a longitudinal translation. A minimum insertion of the conduit is accomplished by introducing a conduit 0.3 times the length PE beyond the plane of the opening. A maximum insertion is accomplished by introducing the conduit up to the end of widened section 160, consequently over a length equal to PE.

The two final positions of the conduit 500 with respect to the spacing block (and the adapter) suitable for crimping differ from each other by a translation distance equal to approximately 0.7 times PE, or about 9% of the outside diameter of the conduit 500, which is also the inside diameter PC of widened section 160 of the spacing block, which permits considerable flexibility in the assembly procedure, while conserving sufficient material thickness over the length of center section 150 to ensure good mechanical resistance at the spacing block.

Figure 5:
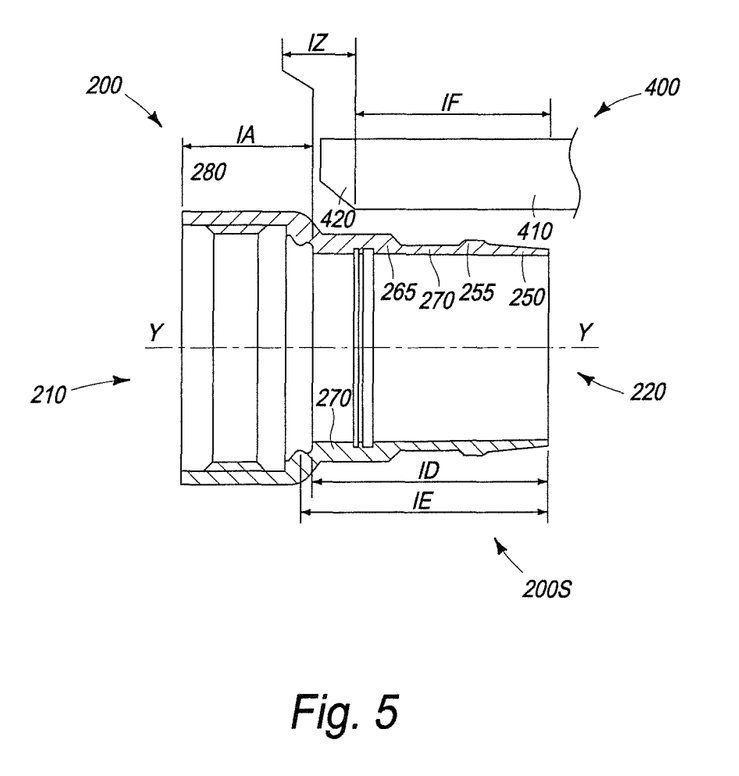
FIG. 5 is a view similar to that of FIG. 2 where the adapter is depicted in the presence of a crimping tool positioned with respect to the adapter according to a step of the process of this invention.

With reference to FIG. 5, a cylindrical crimping tool 400 (likewise depicted in FIGS. 11 and 12) is, positioned all around the adapter 200 with its axis of rotation aligned with axis of rotation Y-Y of the adapter. The crimping tool 400 acts on the circumference of the adapter 200 (and particularly on the section depicted on the right side of FIG. 5, i.e. on the narrow end of the adapter). The tool is symmetrical with respect to the axis Y-Y, but only half of the jaw is shown in FIG. 5, to simplify the view.

Parallel to the axis Y-Y, the crimping tool has a jaw corresponding to a principal section 410, which, as viewed in longitudinal cross-section according to FIG. 5, has a flat interior profile whose surface is parallel with the longitudinal axis.

The crimping tool has a small beveled section 420, whose bevel h is positioned so as to move away from the axis Y-Y as one moves progressively from the narrow opening of the adapter 200 to the wide opening.

The principal section 410 is positioned radially opposite the slightly sloped area 250 of the projecting flat area 255, the receding area 260, the shoulder 265 and the first half of the flat area 270. The beveled section 420 is positioned radially opposite the second half of flat area 270. The combination of these surfaces constitutes a crimping surface (200S) for adapter 200.

For the sake of efficiency, the cylindrical section of the adapter 200 has an optimized longitudinal dimension—of sufficient size, so that, once it is crimped onto the conduit tube up to its narrow opening 220, the adapter is immobilized thereon with a satisfactory mechanical resistance—though minimized to allow material savings.

Accordingly, the crimping is preferably applied up to opening 220, and the length ID constitutes the maximum possible crimping length of the adapter onto the conduit tube. If it is decided not crimp a section of the adapter at opening 220, and therefore not to benefit from all the available material of the adapter for performing the crimping, then the length ID is measured from the plane separating the side of the opening 220 from the section of the adapter that is used for crimping.

Hereinafter, the distance IF designates the distance from the plane of narrow opening 220 (or from the plane separating the side of opening 220 from the section of the adapter that is used for the crimping) up to the end of flat section 410 of the crimping tool at the side of wide opening 210. IF is the longitudinal (or axial) distance over which the crimping on the adapter 200 is actually performed by the crimping tool 400. In the configuration depicted in FIG. 5, the IF/ID ratio is 0.8.

Still referring to FIG. 5, 1Z designates the longitudinal distance between the end of flat section 410 of the crimping tool on the side of the wide opening 210 and the plane marking the boundary of the section defined by the female clipping mechanism at the side of narrow opening 220, which is tangential to the spherical cavity 235.

This distance is called positive if the crimping tool is positioned on only one side of this plane (as is the case in FIG. 5), and it is called negative if the crimping tool extends beyond this plane towards the wide mouth (not shown). Here, ID=IZ+IF.

In the depicted configuration, the distance IZ is equal to approximately 20% of the inside diameter D of the adapter 200, which is also the outside diameter of the conduit 500.

Figure 6:
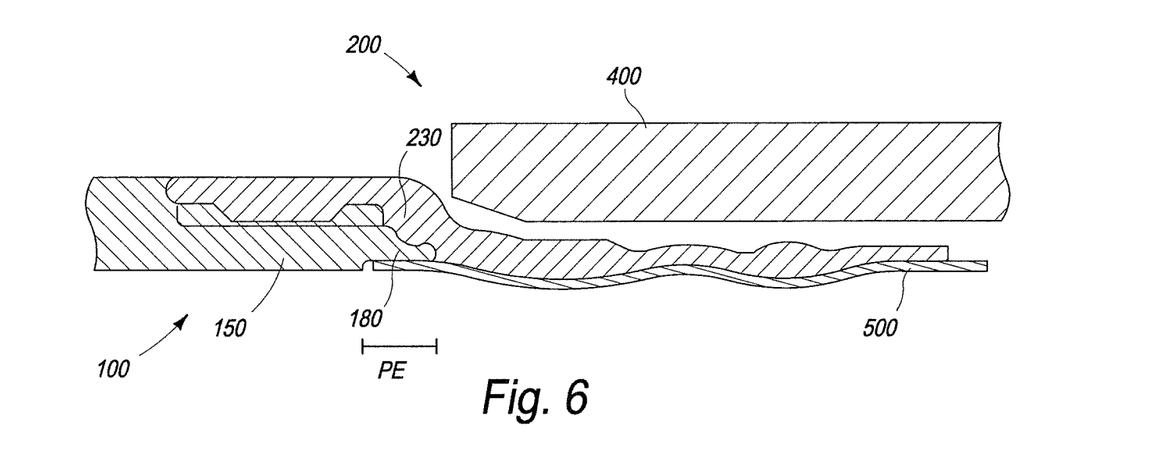
FIG. 6 is a view similar to that of FIG. 4, with a crimping tool having performed the crimping action on an adapter positioned on the conduit tube in the presence of the spacing block, in a first embodiment of the invention.

With reference to FIG. 6, crimping tool 400 is applied to the assembly comprising the adapter 200 combined with the spacing block 100 by clipping, with the assembly having been positioned on the conduit tube 500 as shown in FIG. 4.

In the depicted configuration, the conduit tube 500 is pushed into the widened section 160 of the spacing block 100 over almost the entire length PE, but does not completely abut against the flank of the center section 150 (it is pushed in about 90%).

The crimping caused by the action of the tool 400 causes a plastic deformation of the adapter 200.

The inside diameter of the adapter as measured in the plane of the narrow end of large protuberance 230, the value of which is initially equal to IC (see FIG. 2), is reduced to a value IC. The large protuberance 230 is then pinned flat against the clipping mechanism 180 that is deformed inward, thus reducing its diameter PC (see FIG. 1). This has the consequence of immobilizing the spacing block 100 and the adapter 200 with respect to each other, thus creating considerable friction between their respective surfaces.

The clipping mechanism 180 is likewise pinned flat against the conduit tube 500, eliminating the play between the conduit tube 500 and widened section 160 of the spacing block.

This results in the immobilization of the spacing block and the conduit tube with respect to one another by creating high friction between their respective surfaces and by immobilizing the clipping mechanism 180 in the longitudinal direction.

The crimping of the adapter onto the conduit induces the crimping of the clipping piece of the adapter onto the clipping piece of the spacing block, as well as the crimping of the clipping piece of the spacing block onto the conduit tube 500. This is specifically due to the longitudinal position of the crimping tool in relation to the clipping pieces.

The flat section 410 of the crimping tool 400 applies a force to the adapter 200 over a section thereof located parallel to the axis Y-Y at a distance equal to ID-IF of clipping mechanism 180 of the spacing block, this value being positive in the depicted embodiment. In the depicted embodiment, the IF/ID ratio is 0.8, which has the advantage of optimizing the anchoring of the adapter.

Figure 7:
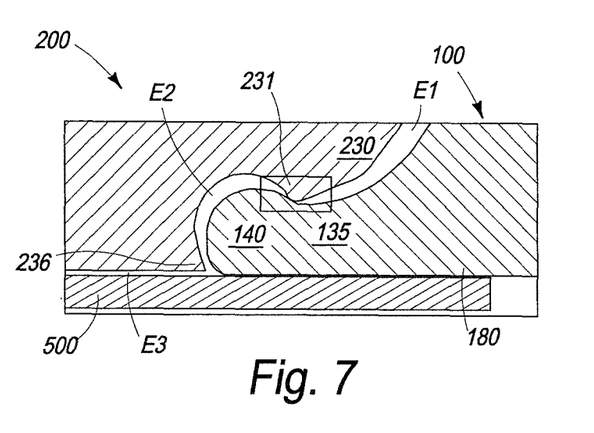
FIG. 7 is a view of the clipping area of the adapter in the presence of the spacing block and a conduit tube, prior to crimping.
Figure 8:
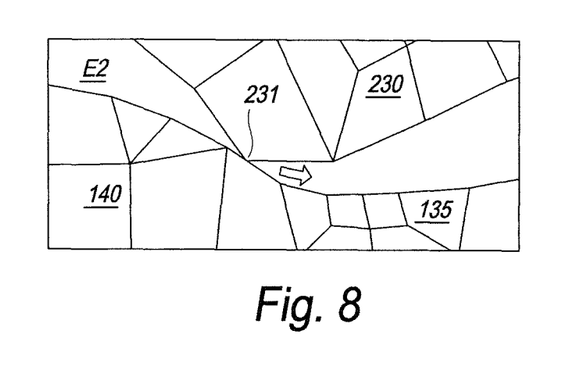
FIG. 8 is an enlarged part of FIG. 7.

With reference to FIGS. 7 and 8, which depict the device prior to crimping, the large protuberance 230 has a projecting angle 231 corresponding to the minimum diameter IC, which enters into nearly single-point contact with the clipping mechanism 180 at the boundary between the hollow area 135 and the projection 140.

A space E1 is present between the large protuberance 230 and the clipping mechanism 180. A space E2, which is an unoccupied part of the cavity 235, is present between the projection 140 and the body of the adapter 200. Lastly, a space E3 is present between the tube 500 and the adapter 200.

The body of the adapter 235 forms a projecting angle 236 at the boundary of the cavity 235 opposite the projecting angle 231, corresponding to the boundary of the cylindrical section 240 and of the cavity 235.

Figure 9:
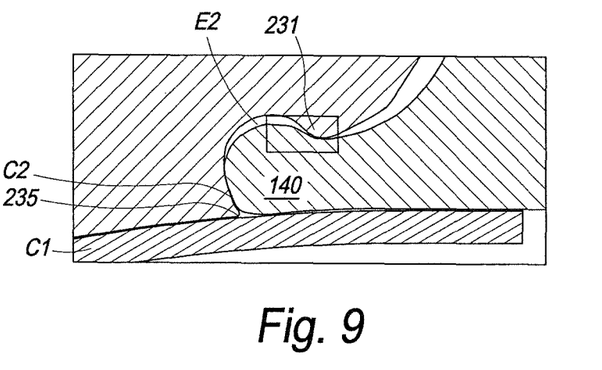
FIG. 9 is a view similar to FIG. 7, after crimping.
Figure 10:
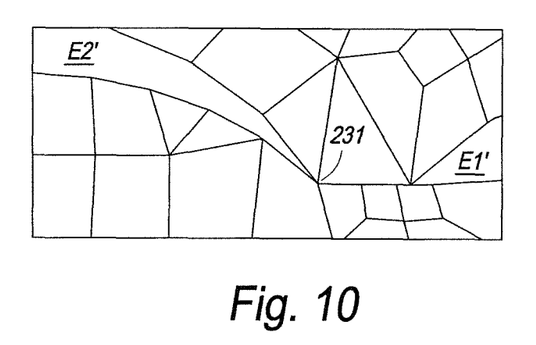
FIG. 10 is a view similar to FIG. 8, after crimping.

With reference to FIGS. 9 and 10, that depict the device after crimping, the space E1 has remained essentially unchanged; however, the volume of the spaces E2 and E3 is considerably reduced. A contact surface C1 is formed between the tube 500 and the body of the adapter 200, almost up to the projecting angle 236. A contact surface C2 is likewise formed between the projection 140 and the body of the adapter 200 next to the projecting angle 236, but not on next to the projecting angle 231, where a residual space E2' is conserved.

The projecting angle 231 has undergone a displacement along the wall of the projection 140, towards the bottom of hollow area 135, along an arrow depicted in FIG. 8 prior to the displacement. The displacement of the projection 140 corresponds to the previously described reduction of the diameter IC.

The result of this displacement is that, in the configuration attained after the crimping, the large protuberance constitutes an obstacle to a longitudinal (or axial) displacement of the projection 140 and therefore of the spacing block with respect to the adapter and is in this manner strengthened with respect to the configuration existing prior to the crimping. This strengthened immobilization of the two parts constitutes the locking induced by the crimping.

It should be pointed out that once the adaptor and the spacing block are crimped onto the conduit according to the process of this invention, the glue previously applied to the screw thread 220 no longer has any particular role with respect to holding the parts in place. It subsequently conducts electricity, except in applications where a non-conducting material is selected for the spacing block.

Figure 11:
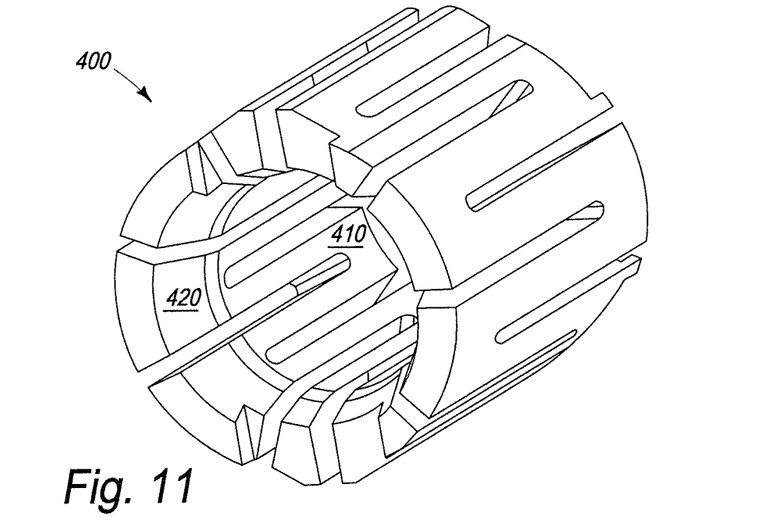
FIGS. 11 and 12 are views of a crimping jaw used in the first embodiment of the invention, in the open and closed positions respectively.
Figure 12:
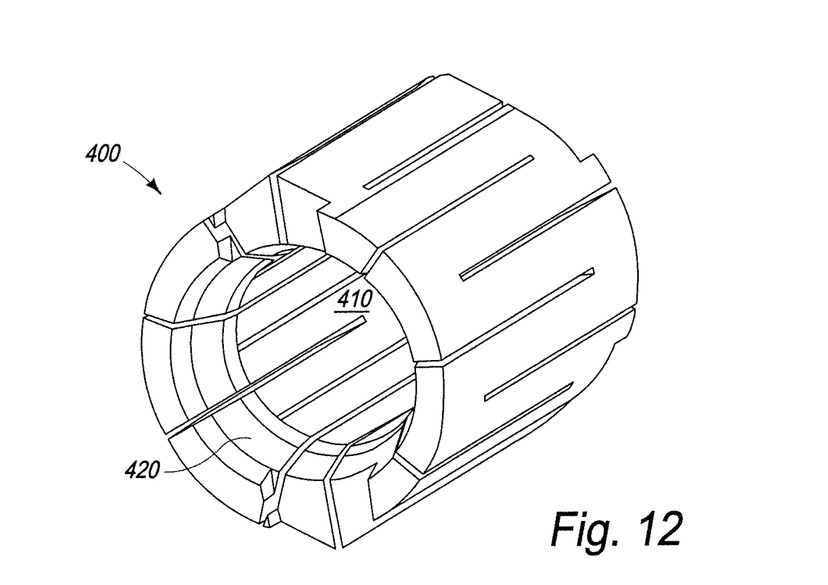

The crimping is performed by means of crimping jaw 400 depicted in the open and closed positions in FIGS. 11 and 12. The flat section 410 and the beveled section 420 are visible.

According to an alternative embodiment depicted in FIGS. 13 to 16, a first step consists of anchoring an adapter 1200 onto the spacing block 100. The o-rings are first positioned in the external groove of the spacing block and respectively in an internal groove 1225 of the adapter, and the axes X-X and Y-Y of the two parts are then aligned.

Figure 13:
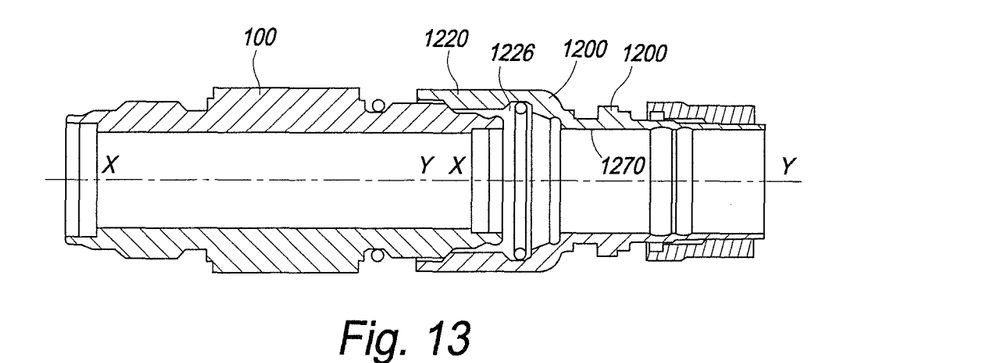
FIG. 13 is a view of the spacing block of FIG. 1 and an adapter used in a second embodiment of the invention, in an initial phase of their connection to one another.

With reference to FIG. 13, the screw thread of the spacing block is then screwed into the tapping 1220 of the adapter until the two parts 100 and 1200 reach a longitudinal abutment position, where the first flat area 1215 of the internal profile of the adapter is radially opposite the o-ring hi the groove of the spacing block, and the flat area 130 of the spacing block is radially opposite the o-ring in the groove of the adapter 1200.

Figure 14:
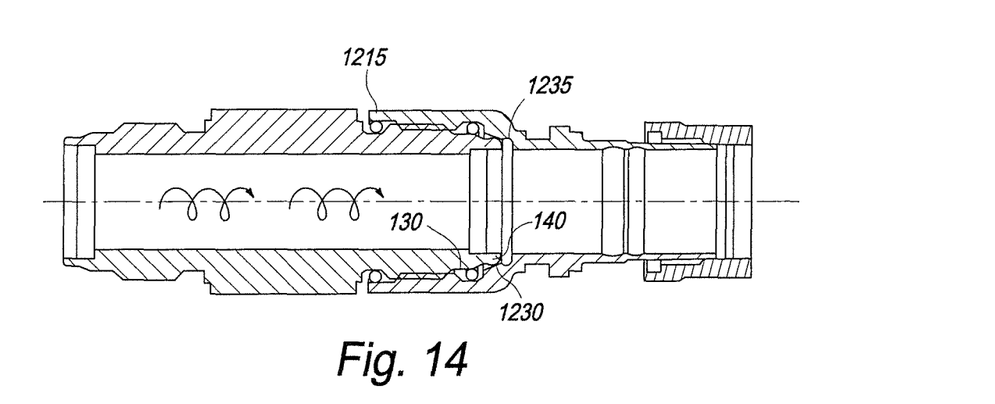
FIG. 14 is a view similar to FIG. 13 in a later phase of the interconnection.

The male clipping mechanism enters into contact, via the projection 140, with a large protuberance 1230 of the female clipping mechanism, causing a longitudinal abutment effect (position depicted in FIG. 14).

With reference to FIG. 14, it is then possible to screw the two parts 100 and 1200 together by applying a screwing torque greater than that applied up to that point (depicted by a thick arrow in FIG. 14).

The clipping mechanism of the spacing block is deformed (not shown) towards the inside of the spacing block, with the projection 140 being pushed radially inwards by the large protuberance 1230, which has the effect of a cam or ramp.

Projection 140 extends beyond the longitudinal abutment position and comes to rest, reassuming its initial shape in the cavity 1235, which serves as a radial projection behind the large protuberance 1230.

During this clipping (or ratcheting) stage, the outside diameter of the clipping mechanism, measured outside the projection 140, which was initially equal to PB (see FIG. 1), whereas the lip of the cavity 1235 had a diameter equal to IC (see FIG. 2 by analogy), is momentarily reduced (PB-IC)/PB by between 0.5 and 5% depending on the embodiments.

This deformation is reversible, and at this stage, if an unscrewing movement is applied to the spacing block with respect to the adapter, an unclipping is possible, causing the projection 140 to come out of the cavity 235, the momentary deformation of the clipping mechanism toward the interior of the spacing block and the return to the position of FIG. 14

Once the clipping is has been performed, the end of the flat area 1215 of the adapter closes the space used to establish the seal. The end of the flat section 130 likewise lies opposite the edge of the large protuberance 230, thus closing the space used to establish the seal, which makes it possible to ensure the water tightness of the joint while the conduits are in operation.

The joining process of this invention can thus include a clipping step performed with a torque of less than 200 N·m, for example a torque of about 3 N·m in certain applications.

Figure 15:
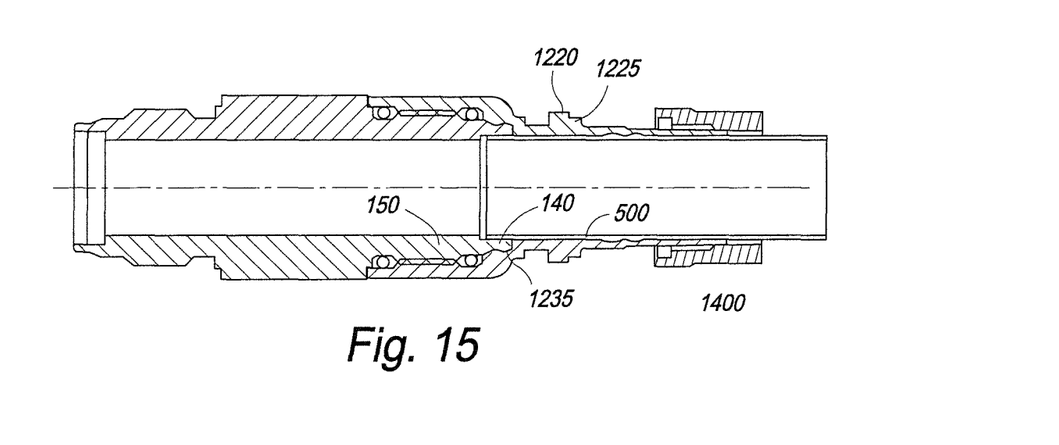
FIG. 15 is a view similar to FIG. 13 in a later phase of the interconnection, and a conduit tube being inserted into the adapter.

With reference to FIG. 15, when the assembly is placed onto a conduit, a conduit tube 500 is inserted into the adapter, up to the section delimited by the clipping mechanisms. It is guided by the wall of the widened section of the spacing block, particularly the wall of the splayed subsection (see FIG. 1).

The conduit tube 500 being used has an outside diameter between the values PC and PF, and is thus capable of engaging with the inside diameter of the widened section of the spacing block, and, if it is introduced onto a length equal to PE, reaching an position of abutment against the projection corresponding to the flank of center section 150.

The adaptor 1200 comprises a principal cylindrical internal section 1270 capable of receiving a conduit tube.

It likewise comprises, on its outside profile, a circular snap ring 1220, radially opposite a part of the principal cylindrical internal section.

With reference to FIG. 15, a crimping ring 1400 is positioned on the adapter 1200, so as to constitute a sleeve for it.

The ring 1400 is then positioned so that it abuts longitudinally against the snap ring 1220. The latter comprises a landing 1225 complementary to a positioning section 1410 of the ring, which facilitates the positioning of the ring against the snap ring (see FIG. 16).

Figure 16:
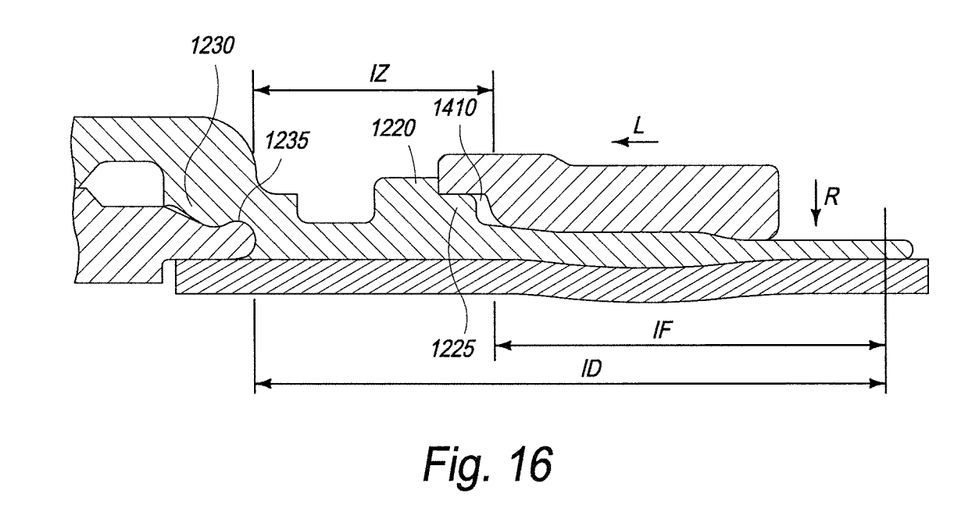
FIG. 16 is a view similar to FIG. 13, with a crimping tool having performed a crimping action on the adapter positioned on the conduit tube in the presence of the spacing block, in a second embodiment of the invention.

The snap ring along with a compression tool (not shown) comprises compression tongs for the ring 1400.

A longitudinal compression (in the direction L) is applied to the ring, which causes its material to flaw radially (in the direction R) thus leading to the crimping of adapter 1200 onto the conduit tube.

In this configuration, the movement and the deformation of the adapter 1200 are comparable to those obtained for the adapter 200 in the first embodiment. The distance between the clipping area and the crimping area can be relatively large.

With reference to FIG. 16, if IF and ID are again defined as being the longitudinal distances measured from the plane beyond which the crimping is applied, and IF and IZ are the longitudinal distances from the plane up to which the crimping is applied (which can be the plane of the end of the adapter), and ID and IZ are the longitudinal distances that stop at the boundary of the clipping piece of the adapter (formed by the large protuberance 1230 and the cavity 1235), —we again have the equation ID=IZ+IF—the ratio IF/ID can, for example, be about 0.5 (with IZ positive, as shown in FIGS. 13 to 16), or conversely greater than 1 (with IZ negative), if the abutment 1220 is located over or beyond the clipping mechanism (not shown).

The radial clamping of the clipping mechanism is in all cases specifically assured by insertion of the tube 500, which is immobilized by the crimping.

It should be noted that in the two embodiments, once the crimping has been accomplished, the spacing block 100 is connected to a second conduit (not shown), at its other end. As was seen in relation to FIG. 1, in the depicted embodiment the spacing block is symmetrical with respect to a plane. It is therefore easy to apply an identical crimping operation with a second adapter (not shown) similar to the adapter of FIG. 2, with this crimping step making it possible to immobilize the spacing block, the second adapter and the second conduit.

Nonetheless, it is apparent that other embodiments are conceivable with a spacing block having a form that differs from that depicted in FIG. 1. Specifically, it is possible to use a 'Y' or a 'T' shaped spacing block, leading to a second and a third conduit. An angled spacing block, e.g. creating an angle of 90° between the axes of the two conduits, can be used. The spacing block can be joined to the second conduit by means other than that described in relation to the adapter 200. This other joining method may or may not involve crimping, while remaining within the scope of the invention. Specifically, a person skilled in the art can use any standard connection for installed piping.

In a detailed example, the spacing block has a resistivity greater than $10^9$ Ω cm, because of the material used.

In other applications, it has a resistivity between $10^2$ and $10^8$ Ω cm, where the expected resistance is between 0.1Ω and 1 GΩ.

Spacing blocks with a measured resistances between 0.1 and 15 kΩ depending on their sizes constitute illustrative embodiments of the invention. Specifically, a spacing block with a usable length of 7.5 cm, an outside diameter of 54 mm, an inside diameter of 11 mm and a resistance of 5 kΩ, made of PEEK loaded with carbon nanotubes constitutes a preferred embodiment of the invention that yields good results on stainless steel conduits.

The invention is not limited to the embodiments that are described.

What is claimed is:

1. A coupling device for conduits for controlling electrical resistance of a conduit circuit, comprising:
    an adapter having a cylindrical section configured to be placed and crimped onto an end of a first conduit;
    a spacing block made of polymeric material and configured to be clipped to said cylindrical section and to be joined to an end of another conduit, wherein
    a part of the cylindrical section is configured to be crimped onto the first conduit while the spacing block is clipped to the adapter and positioned around the end of first conduit, so as to lock the spacing block to the adapter and to deform an assembly comprising a clipping piece of the spacing block and a complementary clipping piece of the adapter, thereby immobilizing the clipping piece and complementary clipping piece relative to each other in a direction parallel to an axis of the cylindrical section of the adapter, and such that an exterior surface of the first conduit engages interior surfaces of the spacing block and the adapter.

2. The coupling device according to claim 1, wherein
    the spacing block is configured to position the first conduit into a crimping position suitable for crimping, and
    the clipping piece and the complementary clipping piece are configured to be immobilized in the crimping position.

3. The coupling device according to claim 1, wherein the spacing block is configured to position the first conduit with a longitudinal positioning freedom with respect to the spacing block equal to at least 2% of a transverse reference width of the spacing block.

4. The coupling device according to claim 1, wherein the clipping piece of the spacing block and the complementary clipping piece of the adapter provide rotational symmetry.

5. The coupling device according to claim 1, wherein the spacing block is made of polyurethane ketone (PEEK).

6. The coupling device according to claim 5, wherein the PEEK is loaded with between 5 and 45% of glass or carbon fibers.

7. The coupling device according to claim 5, characterized in that the PEEK is loaded with between 0.1 and 3% of carbon nanotubes.

8. The coupling device according to claim 5, wherein the PEEK is loaded with carbon nanotubes and a material providing for mechanical reinforcement.

9. The coupling device according to claim 1, wherein the spacing block is made of polyphenylene sulfide.

10. The coupling device according to claim 1, wherein the coupling device is configured to connect two conduits of aluminum, titanium or stainless steel located in an aircraft.

11. The coupling device according to claim 1, wherein the spacing block comprises a non-conducting section with a longitudinal dimension of between 5 and 50 mm.

12. A process for joining a first conduit and a second conduit to control electrical resistance of a conduit circuit, comprising:
    placing a cylindrical section of an adapter onto an end of the first, conduit;
    crimping a part of the cylindrical section onto the first conduit while a spacing block made of a polymer material having a previously chosen conductivity is positioned around the end of the first conduit and clipped onto the cylindrical section, the crimping serving to lock the spacing block to the adapter and to deform an assembly comprising a clipping piece of the spacing block and a complementary clipping piece of the adapter, so as to immobilize the clipping piece and complementary clipping piece relative to each other in a direction parallel to an axis of the cylindrical section of the adapter, and such that an exterior surface of the first conduit engages interior surfaces of the spacing block and the adapter; and joining the spacing block to an end of the second conduit, such that the first conduit is joined via the assembly to the second conduit.

13. The process according to claim 12, wherein prior to the crimping, the first conduit is positioned so as to immobilize the assembly comprising the clipping piece of the spacing block and the complementary clipping piece of the adapter in a crimping position.

14. The process according to one of the claim 12, wherein a longitudinal distance between the clipping piece of the adapter and a section of the adapter to which the crimping is applied is less than two times a reference transverse width of the first conduit.

15. The process according to claim 12, wherein the crimping is an external crimping operation by a jaw having a variable diameter.

16. The process according to claim 12, wherein the crimping is performed by translation of a sleeve along an external surface of the adapter parallel to the axis of the cylindrical section of the adapter, with the external surface having an increasing diameter in a translation direction.

17. The process according to claim 12, wherein the first conduit is made of titanium.

18. The process according to claim 12, wherein the first conduit is made of stainless steel.

19. The process according to claim 12, wherein the first conduit is made of aluminum.

* * * * *